Aug. 27, 1963 W. O. BECHMAN 3,101,794
ANGULAR ADJUSTING MEANS FOR A LAND CLEARING IMPLEMENT
Original Filed Sept. 30, 1959 2 Sheets-Sheet 1

INVENTOR.
WILLIAM O. BECHMAN
BY
ATTYS.

Aug. 27, 1963 W. O. BECHMAN 3,101,794
ANGULAR ADJUSTING MEANS FOR A LAND CLEARING IMPLEMENT
Original Filed Sept. 30, 1959 2 Sheets-Sheet 2

INVENTOR.
WILLIAM O. BECHMAN
BY
ATTYS.

United States Patent Office 3,101,794
Patented Aug. 27, 1963

3,101,794
ANGULAR ADJUSTING MEANS FOR A LAND CLEARING IMPLEMENT
William Otto Bechman, Arlington Heights, Ill., assignor to International Harvester Company, Chicago, Ill., a corporation of New Jersey
Original application Sept. 30, 1959, Ser. No. 843,433, now Patent No. 3,022,836, dated Feb. 27, 1962. Divided and this application Oct. 25, 1961, Ser. No. 147,537
3 Claims. (Cl. 172—698)

This invention relates to an implement and particularly to an implement of a type commonly known as a root plow.

This is a division of patent application Serial No. 843,433, filed September 30, 1959, now Patent No. 3,022,836, issued February 27, 1962. This application concerns a root plow of a type generally utilized for land clearing in areas where the land may be infested with undesirable vegetation having a deep root growth. In these areas an implement known as a root plow has been successful in penetrating the soil to a desired depth, the implement including a cutting blade effective to sever the roots of the undesirable vegetation and to leave the land so that it is acceptable for agriculture. The conventional root plow generally comprises a massive frame consisting of a transverse beam having forwardly extending draft arms connected thereto. A large V-shaped plow blade is provided with vertically extending arms which in turn are pivotally connected to laterally spaced supporting structures provided at opposite ends of the transverse beam. The draft arms are generally connected to a large crawler tractor and include means for raising and lowering the beam and root plow with respect to the ground. The cutting blade is so disposed as to operate within the ground for cutting the roots of any vegetation which is encountered. The conventional root plow includes wedge elements which are associated with the supporting structures and the vertical arms of the blade so as to fix them in a number of angled positions. By adjusting the wedge elements the blade thus can be placed in a number of tilted positions relative to the ground so that the depth of penetration of the blade with respect to the soil may be changed to accommodate varying conditions. In practice, the wedge adjustment is effective but the manipulation of the wedges in order to secure such adjustment, is tedious and time-consuming. The root plow structures are generally quite massive and therefore the removal and reinsertion of wedges to effectuate adjustment is a difficult task, and where it must be frequently made, causes considerable "down" time with respect to the implement. It is a prime object of this invention, therefore, to provide an improved land clearing implement having a novel arrangement for changing the pitch or tilt of the root plow cutting blade.

A still further object is to provide an improved root plow including a plow blade adapted to be positioned in ground-engaging relation in a number of tilted or pitched positions, the said improvement including a simplified and effective means for pivoting the plow blade structure relative to the supporting structure of the root plow.

A still further object is the provision of an improved root plow construction having removable draft arms which are readily adjusted relative to a transverse beam so that the transverse beam and a root plow blade connected thereto can be laterally adjusted with respect to the longitudinal center line of the tractor.

A more specific object is the provision of an improved root plow arrangement including a plow blade adapted to be positioned in a number of angled positions relative to the ground, said plow blade including vertical arms adapted to be pivotally connected to a transverse member of the plow structure, the said root plow including hydraulic extensible means adapted to pivot the vertical arms and the plow blade and to retain the same in a tilted position relative to the ground.

These and other objects will become more readily apparent from a reading of the specification when examined in connection with the accompanying sheets of drawings.

Figure 1:
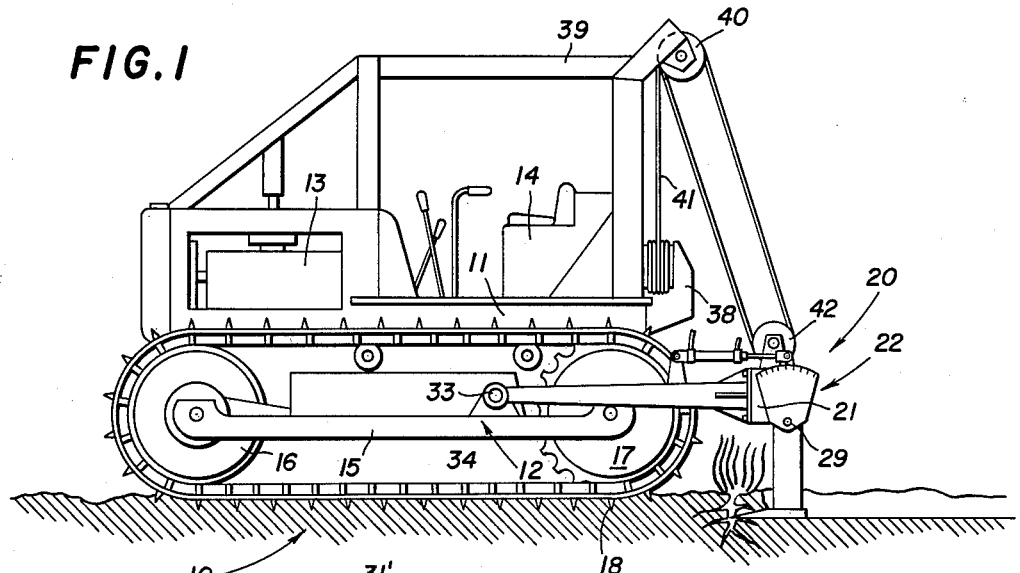
FIGURE 1 is a side elevational view of an improved root plow or land clearing implement connected to a crawler type tractor.

Referring now particularly to FIGURE 1, a crawler type tractor is generally designated by the reference character 10. The crawler tractor 10 comprises a main frame 11 having on opposite sides thereof track frames 12 (only one of which is shown). The main frame 11 supports an engine 13 and an operator's station 14. Each track frame 12 comprises a longitudinally extending frame member 15 having sprockets 16 and 17 connected thereto which suitably drive an endless track 18.

Figure 2:
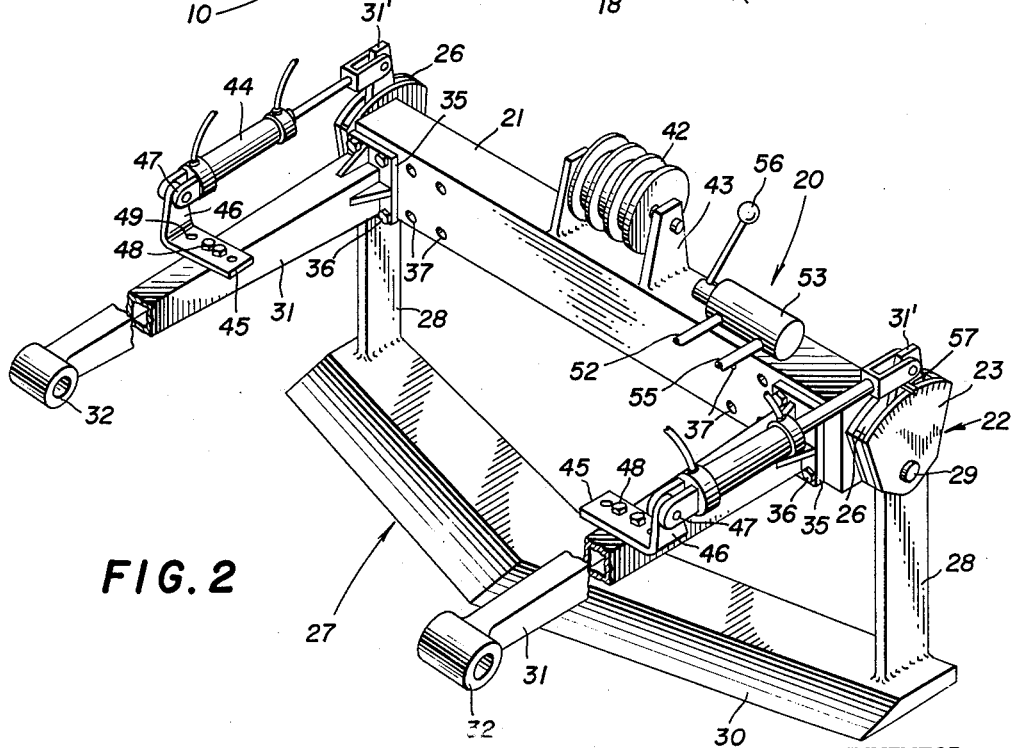
FIGURE 2 is an enlarged perspective view of an improved root plow.
Figure 3:
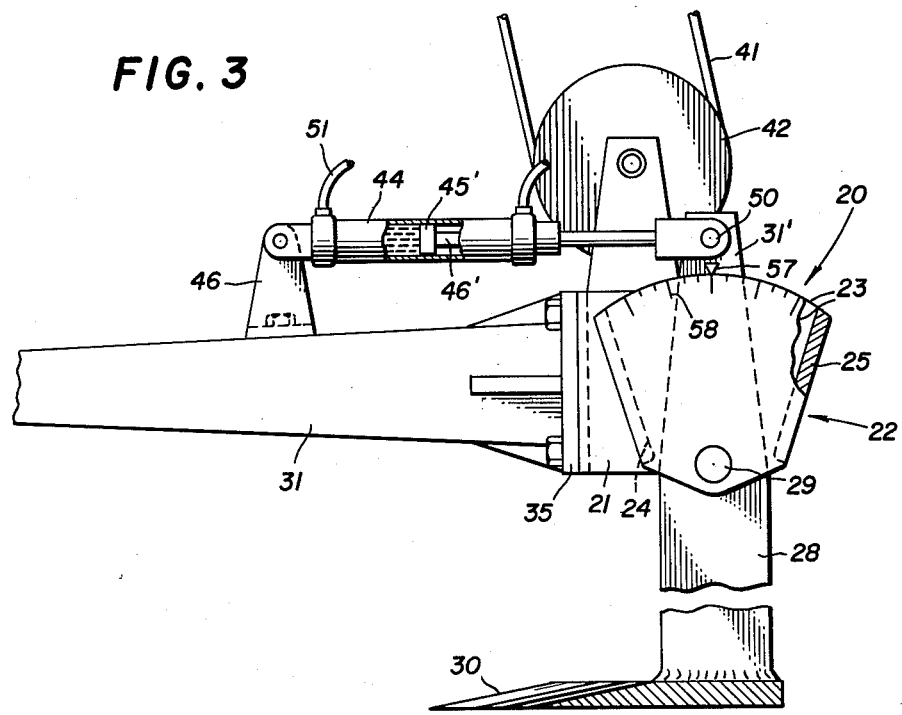
FIGURE 3 is an enlarged side elevational view of a rear portion of a root plow.

FIGURES 2 through 3 disclose a land clearing implement generally designated at 20, the said implement being of a type commonly referred to as a root plow. The implement 20 comprises a transverse box-type beam 21 having at its opposite ends a pair of laterally spaced supporting structures generally designated at 22. Each supporting structure 22 comprises vertically extending and laterally spaced plates 23 suitably connected to a forward plate 24 and a rear plate 25. The plates 23 may be secured to the plates 24 and 25 by welding. As shown in FIGURE 2, the plates 23, 24 and 25 are so positioned and secured to the ends of the beam 21, so as to provide a pair of vertically extending slots 26 in each of the structures 22, the said slots 26 being open at their upper and lower ends.

A V-shaped root plow blade is designated at 27 and includes a pair of transversely spaced upright legs 28 which are suitably pivoted as indicated at 29 by means of a pivot pin on the spaced plates 23. The plow blade 27 is of V-shaped construction having a suitable cutting edge 30. The legs 28 have an upwardly projecting portion 31' which projects upwardly from the plates 23, 24 and 25. The plates 23 on opposite ends of the beam 21 may be suitably welded to the ends of the beam to provide a rigid structure.

A pair of draft arms 31 are provided at their forward ends with pivotal connecting bearings 32 and these bearings 32 are suitably connected by a pivotal means 33 to brackets 34, only one of which is shown, to frame members 15.

The draft members 31 are provided at their rear ends with vertical attaching plates 35 secured to beam 21 by means of bolts 36 engaging threaded openings 37. As shown in FIGURE 2, additional laterally spaced openings 37 are provided to permit adjustment of the draft arms 31 inwardly with respect to the beam 21.

The beam 21 and associated structure including the draft arms 31 may be pivoted on the pivotal means 33 for upward and downward movement relative to the ground by means of a winch 38 positioned at the rear of the tractor frame 11. A superstructure 39 has connected thereto a pulley 40 and cable means 41 extends downwardly and around a plurality of sheaves 42 suitably pivoted on brackets 43 on the beam 21.

Figure 4:
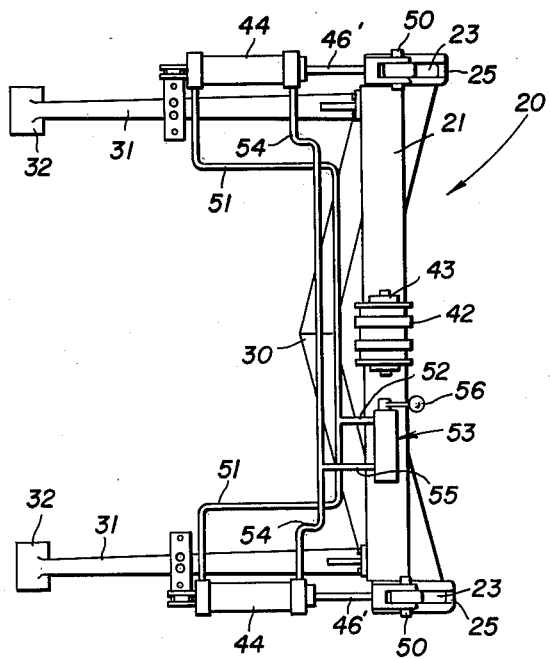
FIGURE 4 is a plan view of a root plow.

The plow blade 30 and the legs 28 may be pivoted on the pivots 29 by means of a pair of fluid cylinders designated at 44. The cylinders 44 are connected to the draft arms 31 by means of brackets 45 having vertical portions 46 which are pivotally connected to the ends of the cylinders by means of pivot pins 47. The brackets 45 are suitably connected to the draft arms 31 by means of bolts 48 extending through holes 49 in the brackets 45. Each of the brackets 45 is provided with an additional number of holes 49 so that the brackets 45 may be adjusted transversely with respect to the draft arms 31. As best shown in FIGURE 3, each fluid cylinder 44 includes a piston 45' having a piston rod 46', the said piston rod 46' of each fluid cylinder 44 being pivotally connected to the upper portions 31' as indicated at 50. Actuation of the pistons 45' within the cylinders 44 is provided by means of fluid entering under pressure through conduits 51 which by means of a conduit 52 extend to a hand pump and reservoir arrangement generally designated at 53. Conduits 54 communicate with a conduit 55 which in turn also extends to the hand pump and reservoir 53, as best shown in FIGURE 4. The pump and reservoir 53 are not described in detail since it may be a conventional suitable hand pump and reservoir unit, which will, upon suitable actuation of internal valving direct fluid under pressure to either of the conduits 51 or 54 in order to reciprocate the pistons 45' within the cylinders 44.

The upper portion 31' of the legs 28 on one side of the root plow as shown in FIGURE 3 may be provided with a suitable indicator 57 adapted to register with indices 58 on one of the plates 23 which indicate depth of penetration in inches of the soil by the blade 27. In operation, as shown in FIGURE 1, the plow blade is disposed beneath the surface of the ground to sever the roots of undesirable vegetation. When the unit is thus operating a slack is provided in the cable 41 and the blade follows the tractor within the ground. By changing the pitch of the plow 27 greater or less digging depth is accomplished. For instance, if fluid under pressure is pumped into the conduits 52 and 51 the piston rods 46' are moved rearwardly to pivot the lower portions of the legs 28 clockwise thus pitching the cutting edge 30 in such a manner that a lesser depth penetration occurs. On the other hand, if fluid under pressure is directed through the conduits 55 and 54 the piston rods 46' will move forwardly causing counterclockwise movement of the legs 28 so as to pitch the blade 30 at a steeper angle with respect to the ground causing greater depth penetration.

The pump 53 may also be suitably located on the operator's station of the tractor so that this adjustment can be made without the necessity of the operator leaving the tractor station. On the other hand, the pump may also be located as indicated in FIGURES 2 and 4 whereby the operator may merely pump the handle 56 and adjust a suitable valve (not shown) in a manner to provide for fluid flow under pressure either through the conduits 51 or 54. The indice markings 58 shown in FIGURE 3 may then be placed in registry with the indicator 57 at the desired depth that penetration of the soil is desired. By a suitable valve lock (not shown) in the pump and reservoir unit 53 the legs 28 may then be hydraulically locked in position during the operation.

Thus it is believed that an improved and novel arrangement for actuating the pitch of a root plow has been disclosed. The draft arms 31 may also be moved inwardly to different positions with respect to the beam 21 by utilizing the adjustment holes 37. If this is done, then the adjustment holes 49 of the brackets 45 are also thus utilized.

While a preferred embodiment of the invention has been disclosed, it must of course be understood that changes and modifications may be made without departing from the spirit of the invention as disclosed or from the scope thereof as defined in the appended claims.

What is claimed is:

1. An implement including a frame comprising a transverse supporting beam, a pair of draft arms, means adjustably connecting said draft arms to said beam whereby said arms may be moved inwardly and outwardly relative to said beam, a pair of laterally spaced supporting structures connected to said beam, each said structure including spaced plate members connected together and providing a vertical slot, with stops at horizontally spaced ends of said slot, a plow blade disposed below said beam, a pair of laterally spaced upright legs connected to said blade, means pivotally connecting said legs to said supporting structures between said plate members and within said slot whereby said blade may be tilted relative to the ground, means for pivoting said legs including a pair of fluid extensible members, means pivotaly connecting each extensible member to each draft arm, each extensible member including a cylinder, a piston and ram reciprocable within each cylinder, means for directing fluid under pressure to said cylinder on opposite sides of said piston for moving the same, and means pivotally connecting said rams above said slot to the said legs, said stops limiting the pivotal movement of said legs.

2. An implement in accordance with claim 1, said means for connecting said extensible members to said draft arms including a pair of brackets, and means adjustably connecting said brackets to said draft arms whereby said extensible members may be moved transversely with respect to said arms.

3. An implement in accordance with claim 2, said legs including upper ends projecting upwardly from said slot, said pivotal means for connecting said rams to said legs being connected to said upper ends.

References Cited in the file of this patent

UNITED STATES PATENTS

| | | |
|---|---|---|
| 1,894,516 | Karstedt | Jan. 17, 1933 |
| 2,323,412 | Noble | July 6, 1943 |
| 2,576,361 | Rath | Nov. 27, 1951 |